United States Patent [19]

Pachuta

[11] Patent Number: 4,687,349
[45] Date of Patent: Aug. 18, 1987

[54] BEARING ASSEMBLY WITH FULL CONTACT SEAL

[75] Inventor: Martin Pachuta, Apopka, Fla.

[73] Assignee: Jervis B. Webb Company, Farmington Hills, Mich.

[21] Appl. No.: 886,018

[22] Filed: Jul. 16, 1986

[51] Int. Cl.$^4$ .................. F16C 33/76; F16C 33/78; F16J 15/32; F16J 15/54

[52] U.S. Cl. ..................... 384/477; 277/53; 277/95; 277/152; 384/482

[58] Field of Search ........ 384/449, 477, 478, 481–486, 384/487, 546, 547; 277/95, 88, 152, 56, 53

[56] References Cited

U.S. PATENT DOCUMENTS

| | | | |
|---|---|---|---|
| 1,420,416 | 6/1922 | Dlesk | 384/477 |
| 2,419,885 | 4/1947 | Cooper | 384/477 X |
| 3,245,735 | 4/1966 | Sikora | 384/482 |
| 3,494,681 | 2/1970 | Anderson et al. | 384/482 |
| 4,384,387 | 5/1983 | Pachuta | 384/449 X |

*Primary Examiner*—Stuart S. Levy
*Assistant Examiner*—Thomas R. Hannon
*Attorney, Agent, or Firm*—Joseph W. Farley

[57] ABSTRACT

A full contact seal for a bearing assembly having an axially outer shield and an annular sealing ring which extends radially inwardly from the outer bearing race axially inward of and adjacent to the shield and which is provided with a radially outwardly facing groove positioned adjacent to the shield. The contact seal comprises a resilient annular sealing member having a base portion adapted to seat in the groove and axially outer and inner sealing lips compressively engaging and bridging the axially facing surfaces of the shield and the sealing ring, the sealing member being resiliently expandable and contractable for insertion into the groove.

6 Claims, 2 Drawing Figures

BEARING ASSEMBLY WITH FULL CONTACT SEAL

SUMMARY OF THE INVENTION

This invention relates to an improved full contact bearing seal particularly adapted to be applied to a bearing assembly of the type shown in U.S. Pat. No. 4,384,387 (the disclosure of which is incorporated herein by reference) for use in connection with a conveyor trolley wheel. The referenced disclosure includes an optional full contact seal which is bonded to the inner periphery of an annular sealing ring fixed to the trolley wheel and which extends radially inwardly into wiping contact with the wheel hub.

In general, a full contact type of seal is included in the bearing assembly of a conveyor trolley wheel only where the trolley is to be used in a conveyor operating under severely contaminated ambient conditions, for example, the airborne grit and other solid or abrasive contaminants encountered in a foundry or the liquid contaminants encountered by conveyors that pass through wash booths and similar processes. The contact seal material must be suited to the ambient operating temperature—a temperature above 200° F. will ordinarily require a different seal material than a temperature below that value. Another application for full contact type seals is to conveyors where it is desirable to provide added protection to the product being handled from lubricant escaping from the trolley bearing assemblies.

While a bonded type of contact seal construction, such as shown in the referenced patent, can provide the desired additional protection against contaminants entering the bearing assembly or lubrication escaping therefrom, this construction requires an increased number of different bearing assemblies and cannot be conveniently applied to existing bearing assemblies. Conveyor trolleys having no contact seal cannot be retrofitted with one in cases where operating conditions show that a contact seal would be desirable.

In this specification, the terms "axial", "axially" and "radially" refer to the axis of rotation defined by a bearing assembly; "axially outwardly" means the axial direction away from the bearing elements of the assembly, and "axially inwardly" means the opposite direction.

The present invention provides a full contact seal which can be readily added to a standard bearing assembly having an inner race, an outer race, antifriction bearing elements interposed between the races, a shield associated with the inner race axially outwardly of the bearing elements and extending radially to an outer periphery positioned adjacent to a portion of the outer race, and an annular sealing ring fixed to the outer race. The annular sealing ring extends radially inwardly from the outer race adjacent to and in axially inwardly spaced relation with the shield, and the inner periphery of the annular sealing ring is formed with an annular radially outwardly facing groove positioned between the annular sealing ring and the shield. The full contact seal comprises an annular resilient sealing member having a radially inner base position adapted to seat in the groove of the annular sealing ring, an axially outer sealing lip extending radially and axially outwardly from the base portio and adapted to extend into compressive sealing engagement with the shield, and an axially inner sealing lip extending radially outwardly and axially inwardly from the base portion into compressive sealing engagement with the annular sealing ring.

The annular resilient sealing member is naturally radially and axially expandable and contractable, is made with a normal size such that it can be expanded like a rubber band for assembly to the groove, and will then seat itself therein by radial and axial contraction. No bonding operation is required in this assembly process and therefore an annular resilient sealing member of the invention can readily be added to, or removed from, an existing bearing assembly having the shield and grooved annular sealing ring components described above.

Another preferred feature of the invention is that the axially outer sealing lip of the annular resilient sealing member extends radially and axially outwardly from the base portion, and is deflected axially inwardly in response to compressive sealing engagement with the shield which is provided with a continuous circular surface portion engaged by the axially outer sealing lip. The axially inward deflection of this sealing lip insures positive compressive sealing engagement of the shield therewith despite axial spatial variations due to manufacturing tolerances, bearing end play, and wear in service.

Other features and advantages of the invention will appear from the description of the embodiment thereof illustrated in the accompanying drawing.

DESCRIPTION OF THE PREFERRED EMBODIMENT

Figure 1:
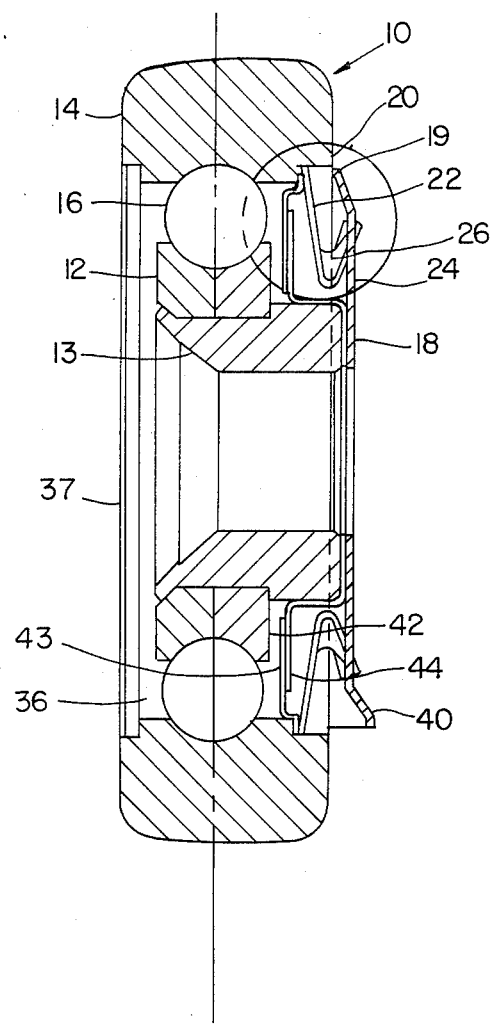
FIG. 1 is a sectional view of a bearing assembly provided with the contact seal of the invention.
Figure 2:
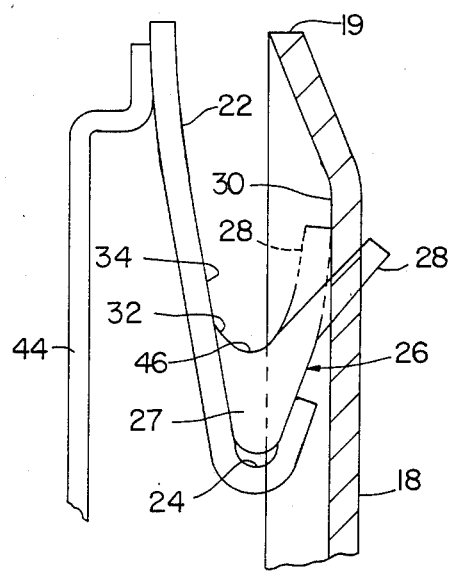
FIG. 2 is an enlarged sectional detail of substantially the encircled area of FIG. 1.

The bearing assembly 10 shown in FIG. 1 is representative of a conveyor trolley wheel. It includes an inner race 12 secured to a hub 13, an outer race 14 formed by the wheel, and antifriction ball bearing elements 16 interposed between the races. The hub 13 is attachable to the axle of a conventional conveyor trolley bracket in the manner shown in the referenced U.S. Pat. No. 4,384,387, or in any other known manner, and is non-rotatable.

Associated with the hub-inner race unit is an axially outer shield 18 which extends radially to an outer periphery 19 positioned adjacent to a portion 20 of the outer race 14, and which is non-rotatably mounted between a trolley bracket and the hub 13 as shown in the referenced patent. An annular sealing ring 22 is fixed to the outer race 14 and extends radially inwardly therefrom adjacent to and in axially inwardly spaced relation with the shield 18. The inner periphery of the sealing ring 22 is formed with an annular radially outwardly facing groove 24 which is positioned between the sealing ring 22 and the shield 18.

The full contact seal of the invention comprises an annular sealing member 26 having a radially inner base portion 27 adapted to seat in the groove 24. An axially outer sealing lip 28 extends radially and axially outwardly from the base portion 27 (as indicated by the solid line showing of the lip 28) and into compressive sealing engagement with the axially inner surface 30 of the shield 18 (as indicated by the broken line showing of the lip 28) when these parts are in assembled relation.

An axially inner sealing lip 32 extends radially outwardly and axially inwardly from the base portion 27 into compressive sealing engagement with the axially outer surface 34 of the annular sealing ring 22.

The sealing member 26 is naturally expandable and contractable radially and axially due to its resiliency. It is made with a normal size such that the base portion 27 can be expanded radially for insertion into the groove 24 and is adapted to seat itself in the groove by radial and axial contraction, so that when assembled in the groove, the base portion 27 and the inner sealing lip 32 are deformed into firm frictional and compressive sealing engagement with the side surfaces of the groove and with the surface 34 of the sealing ring 22, respectively. The outer sealing lip 28 extends axially outwardly a distance greater than the normal axial assembled spacing between the groove 24 and the adjacent axially inner surface 30 of the shield, thereby insuring positive compressive sealing engagement of the lip 28 with the shield surface 30 which is formed as a continuous circular surface portion in the area engageable by the lip 28. The excess axial length of the lip 28 also provides compensation for axial spacing variations due to manufacturing tolerances, to end play in the bearing, and to wear. Should excess lubricant be forced into the bearing cavity 36, defined by a closure disc 37 secured to the outer race 14, through the axial lubricant passage conventionally provided in a conveyor trolley bracket, the lip 28 will be deflected axially inwardly by the lubricant and is self-purging.

Under ordinary operating conditions of conveyors, the sealing means taught by the referenced patent is effective to retain lubricant within and to keep contaminants away from the bearing assembly. Moisture, or other contamination, entering the bearing assembly around the outer periphery 19 of the shield 18, tends to be trapped by the sealing ring 22 and its groove 24 rotating with the outer race 14 and to be expelled through an opening or spout 40 formed in the shield 18. An additional protective barrier is provided by the axial and radial labyrinth passage formed between the radial side wall 42 of the inner race 12, the axially and radially adjacent inner and intermediate seals 43 and 44 fixed to the outer and inner races, respectively, and the annular sealing ring 22. Lubricant tends to be trapped in this labyrinth passage.

In case additional contamination protection is desired or becomes desirable, the full contact seal 26 of the present invention can readily be added to the bearing assembly, and with a selected seal material suitable for the ambiant temperature condition in which a conveyor will be, or is, operating. For example, the contact seal 26 can be supplied in two materials such as Buna-N synthetic rubber or equivalent for operating environments with temperatures up to 200° F. and Viton for temperatures of 200°–450° F.

All of the advantages of the standard bearing assembly taught by the referenced patent are retained when the contact seal 26 is added thereto. The axially outer and inner lips 28 and 32 of the contact seal 26 form a contaminant trapping groove 46 which corresponds to the groove 24 but which forms a positive contact seal bridging the axial gap between the facing surfaces 30 of the shield 18 and 34 of the sealing ring 22.

I claim:

1. A full contact seal for a bearing assembly having an inner race, an outer race, antifriction bearing elements interposed between said races; an axially outer shield associated with said inner race and extending radially to an outer periphery positioned adjacent to a portion of said outer race; an annular sealing ring fixed to said outer race and extending radially inwardly therefrom adjacent to and in axially inwardly spaced relation with said shield, the inner periphery of said annular sealing ring being formed with an annular, radially outwardly facing groove positioned between said annular sealing ring and said shield, said groove having an axial surface portion and axially spaced radial side surface portions; said contact seal comprising an annular resilient sealing member having a radially inner base portion adapted to seat in said groove, an axially outer sealing lip extending radially and axially outwardly from said base portion into compressive sealing engagement with said shield, and an axially inner sealing lip extending radially outwardly and axially inwardly from said base portrion into compressive sealing engagement with said annular sealing ring, said annular sealing member being radially and axially expandable and contractable and having a normal unexpanded size such that said base portion is expandable radially for insertion in said groove and frictionally engages said surface portions of said groove by radial and axial contraction.

2. A full contact seal according to claim 1 wherein said axially outer sealing lip extends axially outwardly from said base portion a distance greater than the axial spacing between said groove and the adjacent axially inner surface of said shield, and said axially outer sealing lip is deflected axially inwardly in response to said compressive sealing engagement with said shield.

3. A full contact seal according to claim 2 wherein said shield is provided with a continuous circular surface portion engaged by said axially outer sealing lip.

4. A full contact seal according to claim 3 wherein said shield is further provided with a radially outwardly directed drain opening disposed radially outwardly of said continuous circular surface portion.

5. A full contact seal according to claim 2 wherein said axially outer and inner sealing lips of said annular resilient sealing member form a radially outwardly facing groove bridging the axial gap between the facing surfaces of said shield and said sealing ring.

6. A full contact seal according to claim 5 wherein said axially outer sealing lip extends radially outwardly from said base portion a distance greater than the radial outward extension of said axially inner sealing lip.

* * * * *